(12) United States Patent
Ashby et al.

(10) Patent No.: US 8,055,534 B2
(45) Date of Patent: Nov. 8, 2011

(54) VARIABLE RATE TRAVEL FEE BASED UPON VEHICLE OCCUPANCY

(75) Inventors: Duncan Ashby, Surrey (GB); Rick A. Hamilton, II, Charlottesville, VA (US); Naveen Lamba, Haymarket, VA (US); Colin Fung Wan Lim, Twickenham (GB); James W. Seaman, Falls Church, VA (US); Vinodh K. Swaminathan, Riverside, CT (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 12/341,087

(22) Filed: Dec. 22, 2008

(65) Prior Publication Data
US 2010/0161392 A1    Jun. 24, 2010

(51) Int. Cl.
*G07B 15/00*    (2011.01)
*G07B 15/02*    (2011.01)
(52) U.S. Cl. ..... 705/13; 340/905; 340/425.5; 705/14.14
(58) Field of Classification Search .................... 705/13; 340/928, 572, 905; 235/384
See application file for complete search history.

(56) References Cited

U.S. PATENT DOCUMENTS

| | | | | |
|---|---|---|---|---|
| 4,336,522 | A * | 6/1982 | Graham | 340/459 |
| 5,920,057 | A * | 7/1999 | Sonderegger et al. | 235/384 |
| 6,078,895 | A * | 6/2000 | Ryu et al. | 705/13 |
| 7,215,255 | B2 | 5/2007 | Grush | |
| 7,375,648 | B1 * | 5/2008 | Mulka et al. | 340/905 |
| 2002/0072963 | A1 * | 6/2002 | Jonge | 705/13 |
| 2002/0084917 | A1 * | 7/2002 | Hauptman et al. | 340/937 |
| 2002/0115410 | A1 | 8/2002 | Higashino et al. | |
| 2003/0065630 | A1 * | 4/2003 | Brown et al. | 705/413 |
| 2003/0115095 | A1 * | 6/2003 | Yamauchi | 705/13 |
| 2004/0049424 | A1 * | 3/2004 | Murray et al. | 705/14 |
| 2005/0049781 | A1 * | 3/2005 | Oesterling | 701/207 |
| 2005/0168351 | A1 | 8/2005 | Saze et al. | |

(Continued)

FOREIGN PATENT DOCUMENTS

EP    1519288    * 3/2006

OTHER PUBLICATIONS

"Real-Time Ridesharing Launches on SR 520 to Save Commuters Time, Money," published by Business Wire Jan. 27, 2011, pp. 1-3.*

*Primary Examiner* — John Hayes
*Assistant Examiner* — Brian Epstein
(74) *Attorney, Agent, or Firm* — Patrick J. Daugherty; Driggs, Hogg, Daugherty & Del Zoppo Co., LPA (57) ABSTRACT

Methods, including service methods, articles of manufacture, systems, articles and programmable devices are provided for charging travel fees or awarding benefits as a function of vehicle occupancy. Variable travel fee schedules include a plurality of different rate values, each rate value associated with ride-sharing service points of a vehicle infrastructure and vehicle occupancy counts. Occupants within a vehicle traveling via a vehicle infrastructure are counted, the counting generating discrete occupant counts correlated with the ride-sharing service points. Subsets of variable travel fee schedule rate values are selected as a function of association with discrete occupant counts and correlated ride-sharing service points. Owners, occupants or other parties associated with the vehicle are accordingly charged a travel fee or awarded a benefit as a function of the rate value subset and an amount of the vehicle traveling.

12 Claims, 4 Drawing Sheets

U.S. PATENT DOCUMENTS

| | | | |
|---|---|---|---|
| 2005/0179563 A1* | 8/2005 | Kelley | 340/928 |
| 2005/0187820 A1* | 8/2005 | Mohan | 705/14 |
| 2005/0278214 A1* | 12/2005 | Takida | 705/13 |
| 2006/0015394 A1* | 1/2006 | Sorensen | 705/13 |
| 2007/0100687 A1 | 5/2007 | Yoshikawa | |
| 2007/0268140 A1* | 11/2007 | Tang et al. | 340/572.4 |
| 2008/0021723 A1* | 1/2008 | Devarakonda | 705/1 |
| 2008/0175438 A1* | 7/2008 | Alves | 382/105 |
| 2008/0195428 A1* | 8/2008 | O'Sullivan | 705/6 |
| 2008/0208680 A1 | 8/2008 | Cho | |
| 2009/0018902 A1* | 1/2009 | Miller et al. | 705/13 |
| 2009/0287408 A1* | 11/2009 | Gerdes et al. | 701/202 |
| 2010/0085213 A1* | 4/2010 | Turnock et al. | 340/928 |
| 2010/0106567 A1* | 4/2010 | McNew et al. | 705/13 |
| 2010/0201505 A1* | 8/2010 | Honary et al. | 340/425.5 |

* cited by examiner

VARIABLE RATE TRAVEL FEE BASED UPON VEHICLE OCCUPANCY

FIELD OF THE INVENTION

The present invention generally describes methods, systems and devices for providing variable travel fees. More particularly, rates may be selected responsive to real-time vehicle occupancy.

BACKGROUND OF THE INVENTION

The automobile is generally the most common form of daily transportation for travelers or commuters of all kinds. As the number of vehicles on roads continues to grow, traffic congestion and pollution have become very problematic. Management of public thoroughfares comprehends managing use of a variety of travel options, including personal automobile use on public roads, regional and intrastate highways, interstate highways, public toll and access roads, private toll and access roads, as well as of various forms of public/mass transportation (e.g., buses, trains, ferries, etc.). Travelers have many differing travel requirements, options, and habits, each of which impact their decisions on travel option use.

Management of travel issues and options may also contemplate considering the impact of each existing, planned, and proposed transit system on the environment. It is generally desirable to increase the green nature, for example an earth or environmental friendliness, of regional transit systems, and in one aspect considering larger area or national impacts. It is generally considered greener to pursue policies that encourage travelers to maximize their use of mass transportation options in order to minimize their automobile usage, and in particular to minimize individual trips with no other passengers by encouraging car pooling and ride-sharing behaviors.

However, travel system management and service provider entities may have difficulty balancing the requirements and desires of commuters and other travelers against travel system requirements and attributes, for example serving traveler needs while also responding to traffic congestion, environmental impact, availability and use of mass transit, and equitable distribution of travel cost issues. Thus, travelers often select travel options based on their personal costs (e.g. time and money), and not in response to overall general efficiency and environmental impact costs, in some examples resulting in multiple single-occupancy vehicle trips to common destinations rather than reduced trips through ride sharing, thus having a negative environmental impact relative to more environmentally-favorable ride sharing options.

SUMMARY OF THE INVENTION

Methods are provided for charging travel fees or awarding benefits as a function of vehicle occupancy. A variable travel fee schedule includes a plurality of different rate values, each of the rate values associated with ride-sharing service points of a vehicle infrastructure and each of a plurality of vehicle occupancy counts. Occupants within a vehicle traveling via a vehicle infrastructure are counted, the counting generating discrete occupant counts each correlated with the ride-sharing service points. A subset of the variable travel fee schedule rate values is selected as a function of association with the discrete occupant count or counts and any correlated ride-sharing service points. Owners, occupants or other parties associated with the vehicle are accordingly charged a travel fee or awarded a benefit as a function of the rate value subset and an amount of the vehicle traveling via the infrastructure.

Service methods are also provided comprising deploying applications for charging travel fees or awarding benefits as a function of vehicle occupancy according to the method steps described above, for example by a service provider who offers to implement, deploy, and/or perform functions for others. Still further, articles of manufacture comprising a computer usable medium having a computer readable program in said medium are provided. Such program code comprises instructions which, when executed on a computer system, cause the computer system to perform one or more method and/or process elements described above for charging travel fees or awarding benefits as a function of vehicle occupancy. Moreover, systems, articles and programmable devices are also provided, configured for performing one or more method and/or process elements of the current invention for charging travel fees or awarding benefits as a function of vehicle occupancy, for example as described above.

BRIEF DESCRIPTION OF THE DRAWINGS

These and other features of the methods, systems and devices according to the present application will be more readily understood from the following detailed description of the various aspects of the embodiments taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience the Detailed Description of the Invention has the following sections:
I. General Description; and
II. Computerized Implementation.

I. General Description

The present application discloses systems, methods, devices and program products for charging travel fees or awarding benefits as a function of vehicle occupancy. As used in the present application the terms "toll" and "travel fee"

refer not only to tolls or other fees associated with specific and designated toll or fee-for-use thoroughfares, but also to any fee or charge, or any credit or benefit, that may be assessed or awarded in association with a thoroughfare by a traveler. For example, a travel fee according to the present invention may comprehend a car-pool credit awarded, or a fee charged or debited from an account) in response to travel on any road, including free-ways and secondary roads, in traveling from an origin point to a destination point, and other examples will be apparent to one skilled in the art.

Figure 1:
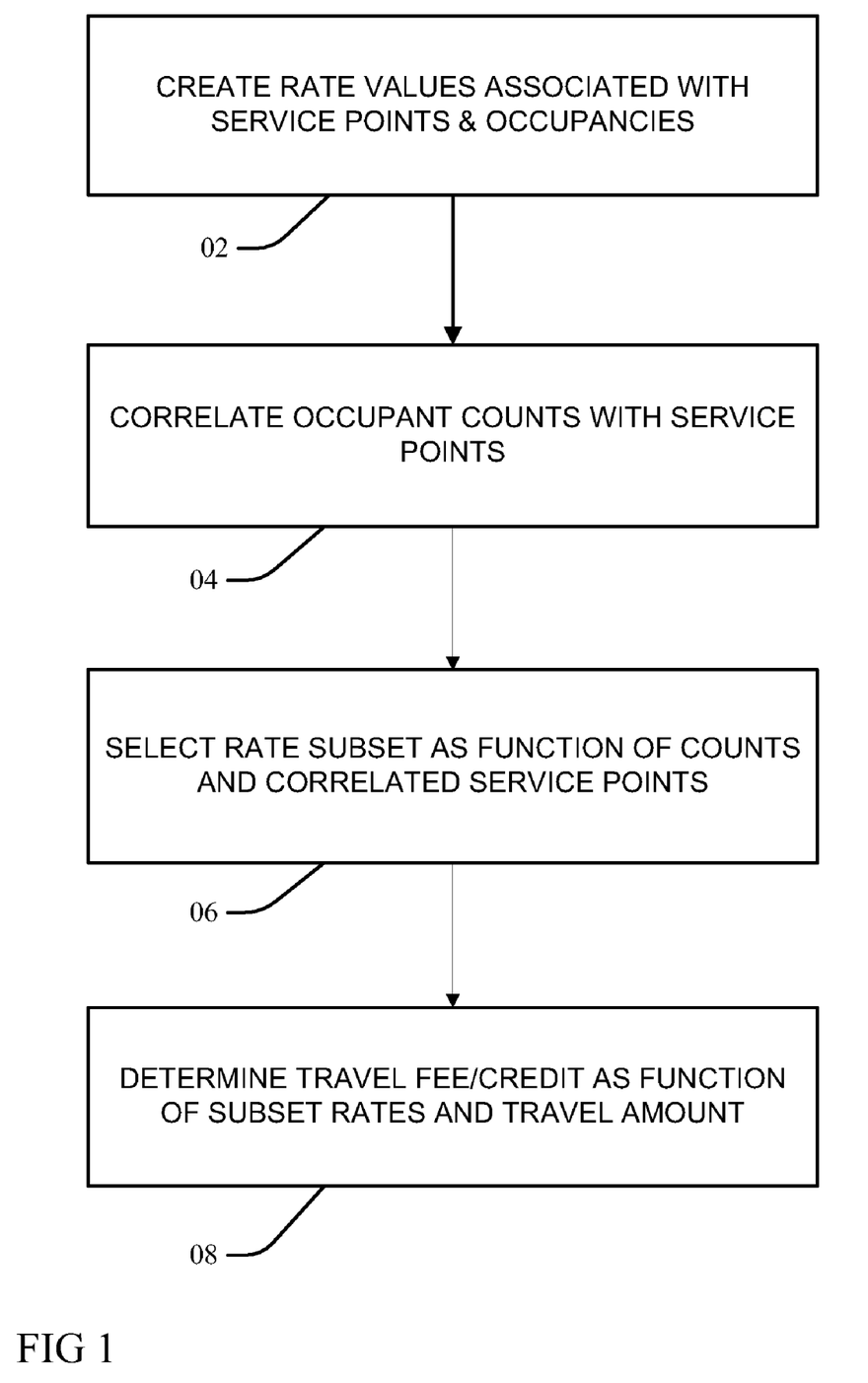
FIG. 1 is a flow chart illustrating a method and system for charging travel fees or awarding benefits as a function of vehicle occupancy according to the present invention.

FIG. 1 illustrates one embodiment of the present invention wherein at 02 a variable travel fee rate schedule is created comprising a plurality of different rate values, the rate values associated with one or more ride-sharing route option service points along a vehicle infrastructure, the rate values relevant to or applicable to travel fees or credits or some other quantified cost or benefit attribute, each rate value further associated with a vehicle occupancy count. At 04 occupants within a vehicle traveling via the vehicle infrastructure are counted, in some embodiments while proximate to or passing one or more service points, the counting generating at least one discrete occupant count for association with a ride-sharing service point.

At 06 a subset of the variable travel fee rate schedule rate values is selected as a function of an association with one or more correlated occupant counts and ride-sharing service points. Accordingly, at 08 a travel fee is charged or a benefit is awarded to an occupant or a vehicle operator, owner or other party associated with the vehicle as a function of the selected rate value subset and an amount of travel of the infrastructure by the vehicle.

It will be appreciated that travel fees and benefits may comprehend a wide variety of fees or accounts, including those associated with the use of public mass transportation (e.g. bus, train, ferry, pedestrian toll bridge access, etc.), as well as for use of fee-based and free vehicle infrastructure (e.g. public roads and limited-access freeways, turnpikes, canals, bridges, ferries, parking garage, etc.). The term "vehicle" encompasses public and private automobiles as well as buses, trains, boats or any other apparatus configured to carry occupants from one destination to another. Travelers and/or their associated vehicles may travel along dedicated transit infrastructures (e.g. railroad tracks), as well as along defined travel options through their regular paths and schedules (e.g. defining a shipping channel or inter-coastal waterway, in some examples with infrastructure or maintenance supported by fees). Additionally, travel options and vehicles also comprehend self-powered modes of travel (e.g. bicycle, wheelchair, etc.), over associated infrastructure with or without any vehicle or apparatus (e.g. by foot as a pedestrian over a toll bridge, or onto a ferry, etc.).

In the implementation and management of travel thoroughfares, it is advantageous to consider environmental impact issues. For example, travel thoroughfare management may include a goal of increasing the green nature or earth/environment friendliness of a regional or national transit system network. In one aspect, it is possible to measure the environmental friendliness or total relative impact of a given toll thoroughfare, including determining a "carbon footprint" of use of the thoroughfare. A carbon footprint may be defined as a measure of the impact an activity has on the environment, and in particular with regard to thoroughfares as the amount of greenhouse gases produced in burning fossil fuels for traveler and cargo transportation activities on the thoroughfare. Greenhouse gases are believed to impact the environment through causing climate change, and thus it has become known to quantify the carbon footprint of an activity as the measurement of greenhouse gases produced, typically as an equivalent of carbon dioxide gases generated in units of tons or kilograms. Thus, for a given roadway, it is generally desired to reduce the total vehicles used to transport a given number of commuters or other travelers, and thus to increase vehicle occupancy through ride-sharing to proportionately reduce the number of vehicles used to transport said given number of commuters.

In one aspect, the present invention addresses the issue of duplicated travel or trips by travelers to common destinations/waypoints or from common origins in disparate vehicles, providing encouragement to commuters and other travelers to participate in ride sharing or car-pooling by reducing travel related fees or providing another benefit. Embodiments of the present invention introduce new and convenient systems and methods for rewarding commuters who participate in ride sharing rather than commuting in individual vehicles, in one aspect through systems easier to use than present ride sharing and car-pool programs through eliminating prerequisite commitment or sign-up requirements, as well as the administration of said commitment or sign-up requirements, and which may be further dynamically and automatically applied and implemented.

More particularly, prior art methods and systems generally require prerequisite registration and sign-up activities by commuters and/or vehicle operators. Parties must find and contact an appropriate administrative entity and request permission to participate, and even then may only engage in ride sharing if they can find other commuters or vehicle operators who are both utilizing the same administrative entity and sharing similar/complementary travel requirements (e.g. similar or cooperative origin and destination locations as well as travel time and date parameters.) Additionally, even if said prerequisites are met, in the prior art the parties may also have compliance burdens resulting in cumbersome self-reporting to one or more administrative entities, wherein failure to meet said burden may result in a denial of rewards.

In contrast, the present invention provides advantages in enabling and creating a completely automated, open, and dynamic system that all commuters may participate in as circumstances permit without requiring onerous prerequisites. The present invention is not limited to fixed commuting schedules and routes (e.g. to and from designated home or work locations, or during agreed upon or otherwise specified times and dates), and is instead applicable to other road traffic and trips of indeterminate destination, origin or waypoint locations or time and date parameters, trips generally excluded from consideration by prior art systems. Associations of roads and other infrastructure with benefit-accruing ride-sharing behaviors may also be dynamically revised or updated, adding another layer of flexibility and capability not possible under the prior art.

Figure 2:
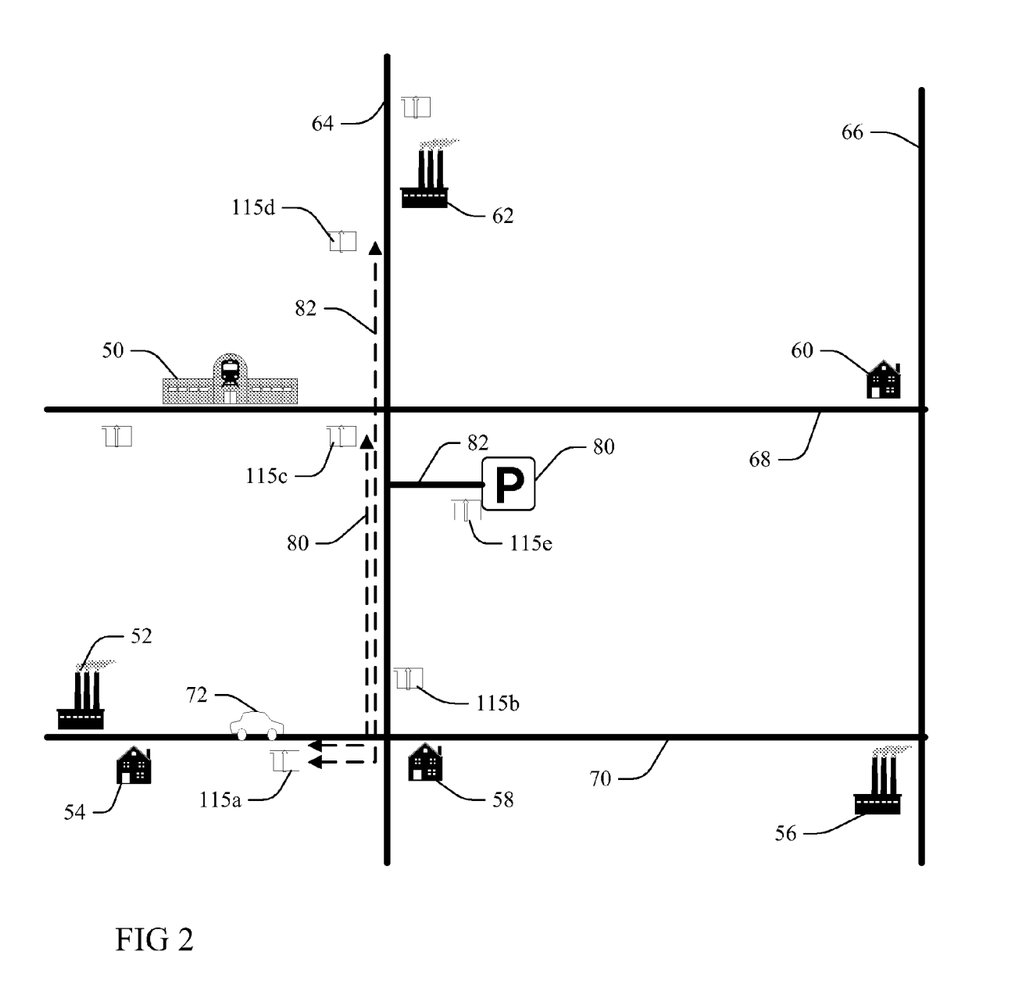
FIG. 2 is diagrammatic illustration of an implementation of a method and system for charging travel fees or awarding benefits as a function of vehicle occupancy according to the present invention.

Referring now to FIG. 2, a mass transit station 50 and a variety of organizational or business locations 52/56/62 and residence locations 54/58/60 are depicted arrayed about a plurality of roads 64/66/68/70. Besides a regular commute to a school or business or other organization 52/56/62, many commuters and workers may have occasion to take one or more additional vehicle 72 road trips during a business day at various times of the day or evening exclusive of known peak commuting times. Illustrative but not exhaustive additional vehicle 72 road trip examples include a group of commuters travelling individually between common work campus buildings 52/56/62 for meetings and projects; trips between an office 52 and a data center 56/62; trips between an office 52 and a client residence 54/58/60 or other organizational location 52/56/62; trips between an office 52 and a restaurant 56 or a gymnasium or other recreational location 62 for lunch, to work out, relax; or trips to pick up or drop off mass transit passengers from the mass transit station 50. Other additional trips will also be apparent to one skilled in the art as appropriate for use with the present invention, and the invention is not limited by the illustrative examples provided therein or elsewhere.

Under the prior art there is generally no incentive for ride sharing for such additional trips, as such additional trips are generally outside the comprehension of prior art ride sharing and car-pooling systems and methods and thus typically no reward exists for ride sharing or car-pooling for such trips. As it is also typically more convenient and time-efficient to execute such trips without arranging to share the trip with another, such trips tend to comprise single occupants each using individual vehicles 72. However, according to the present invention each person participating in a shared vehicle 72 ride may benefit from a decrease in an assessed travel fee or reward of a benefit.

Figure 3:
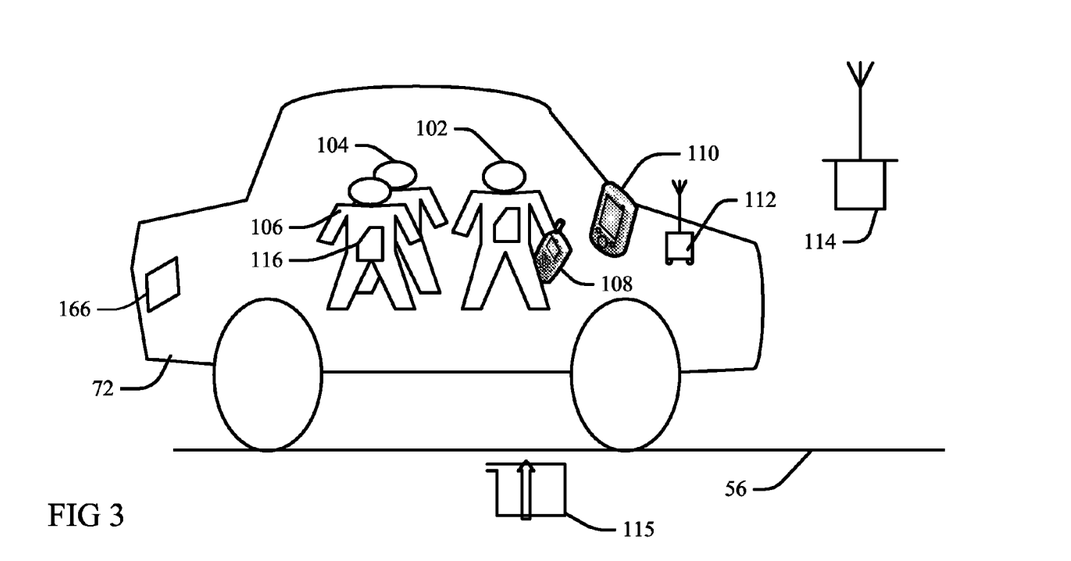
FIG. 3 is a diagrammatic illustration of an implementation of a method and system for charging travel fees or awarding benefits as a function of vehicle occupancy according to the present invention.

Referring now to FIG. 3, in one embodiment the present invention deploys an enhancement in one or more travel fee account administration or data exchange systems associated with a driver 102 and passengers 104/106 within a vehicle 72. Illustrative but not exhaustive examples of systems and components appropriate for practicing the present invention include personal data devices 108 (e.g. a personal digital assistant (PDA), a personal computer or a cellular telephone); in-vehicle data or global positioning satellite system (GPS) systems 110, for example a fare box or collection device, an OnStar® or a Garmin® system (ONSTAR is a trademark of the OnStar Corporation in the United States, other countries, or both, and GARMIN is a trademark of Garmin Ltd. in the United States, other countries, or both); vehicle transponders 112 configured to communicate wirelessly with automated electronic toll collection system (ETC) transponders or hubs 114 and/or road scanners 115, for example incorporating EZ-Pass® and/or SunPass® systems and the like (EZ-PASS is a Trademark of the EZ-Pass Interagency Group in the United States and/or other countries, and SUNPASS is a trademark of the Florida Department of Transportation in the United States and/or other countries); and personal, physical machine-readable media carried by each of the commuters 102/104/106, for example including personal encoded tickets, fare cards, or tokens 116 wherein the tokens 116 and devices 108/110 may each be configured to communicate with each other as well as one or more of the vehicle system devices 110, vehicle transponder 112, road transponders 114 and scanners 115. In one aspect GPS systems 110 may be used to track traveler or associated vehicle use of a thoroughfare independent of toll road use and associated ETC or fare box systems, thus extending travel determination according to the present invention beyond conventional toll thoroughfares and mass transit options.

Thus, in one embodiment, an radio frequency identification (RFID) reader or interface present within one of the devices 108/110, vehicle transponder 112 and road and collection transponders 114/115 may scan and recognize each passive RFID device or token 116 carried by the commuters 102/104/106 and thereby determine an occupancy or occupant count of the vehicle 72, each of the identification devices 116 having a unique identification indicia. This may be easily implemented with respect to required identification cards (ID's), for example driver's licenses, passports, employer-issued ID's, student ID's, and the like. Incorporation of passive RFID components in said ID's, or within a personal device 108 carried by each of the commuters 102/104/106, may be easy and inexpensive. ID's may also be thus obtained and provided for child commuter passengers 104/106. A vehicle occupancy count may thus be automatically obtained, as well as dynamically updated or maintained in real-time, and the count used real-time (including with respect to discrete points of service) to determine travel fees or benefit rewards, in some examples by scaling fees/rewards in direct relation to observed numbers of occupants.

Vehicle trips appropriate for observation and use according to the present invention may also be determined and recognized dynamically through real-time data observations of vehicle 72 locations and movement, including data from the tokens 116/personal devices 108. Any of the devices 108/110/112 or token 116, may communicate location and trip GPS data and occupant count data in real-time to a wireless hub 114, wherein said trip and occupant count data which may be processed or otherwise used to identify any of the additional trips described above as a ride sharing or car-pooling trip and provide commensurate rewards, discounted tool fees, etc., to one or more of the commuter occupants 102/104/106. Thus, in one example, recognizing that vehicle 72 has three occupants 102/104/106 while travelling along any of the roads 64/66/68/70 at any time may result in a credit or discount-for-services rewarded to accounts associated with each of the commuters 102/104/106, thereby encouraging each of the three commuters 102/104/106 to seek ride-sharing opportunities whenever possible.

In another aspect, roads or infrastructure subject to road-sharing benefits according to the present invention may be dynamically identified, updated/revised and notice thereof communicated to the commuters 102/104/106 or vehicle 72. Thus in one example, rewards may be limited to travel on the busiest of the roads 64/66/68/70, or to heavy traffic conditions thereon, as dynamically observed in real-time, with the dynamic determinations further communicated in real-time to the commuters 102/104/106 through the personal devices 108, vehicle device 110 or even the tokens 116.

Referring to FIGS. 2 and 3, occupant counts and vehicle travel may be determined continually in real-time, for example through a stream of data acquisitions acquired by one or more of the route transponders 115 and/or hubs 114 continuously or at regular intervals from the tokens 116 and/or devices 108/110/112 within the travelling vehicle 72, thereby continuously and dynamically ascertaining vehicle 72 occupant 102/104/106 count data and location and trip data relative to the roads 64/66/68/70. Determinations may also be made through a plurality of discrete acquisitions: for example, toll road or other travel route transponders 115 may also directly scan passing vehicles 72 and/or commuter/travelers 102/104/106 traveling by and acquire data indicative of road 64/66/68/70 use from any of the vehicle transponder 112, devices 104/110 or tokens 130, or by scanning a vehicle license plate 166 or other indicia tag 166, in one aspect each passing and/or scanning event serving as a discrete data observation remote in event time from another. Illustrative but not exhaustive scanning examples include optical scanning (e.g. optically scanning a passing license plate 166) and Radio Frequency Identification (RFID) methods and systems, which may scan a passing RFID tag 166 or token 130 comprising unique Vehicle Identification Number (VIN) data or commuter/traveler identification data (e.g. commuter 102/104/106 carbon offset account numbers, driver's license numbers, facility permit numbers or social security numbers).

Each of the travel route transponders 115 may also serve as a service point for selection of travel fee rates, rewards or a calculation thereof. In one example discrete time, date, road segment and other trip data may be acquired and used from route transponders 115a, 115b, 115c and 115d as the vehicle 72 passes each consecutively in traveling from an office building 52 to a satellite building 62, for a trip (or overall total amount of travel) defined from route transponders 115a through 115d, each discrete data observation also associated with real-time occupant 102/104/106 count data and used to select and apply a different subset rate. Accordingly, if one of the passengers 106 disembarks in route between route transponders 115c and 115d, then the remaining portion of the total trip will have new/update/revised total occupant count data: thus the total travel amount/trip comprises a first leg with the three occupants 102/104/106 from transponder 115a to transponder 115c and a second leg with the two occupants 102/104 from transponder 115c to transponder 115d, resulting in a subset first-leg rate selected for the three occupants 102/104/106 and a different second-leg rate selected for the two remaining occupants 102/104. A total fee charged/benefit rewarded for the total trip is thus a combination of, or other function of: (1) a charge/benefit for the first leg calculated from the first-leg distance travelled/use between the transponders 115a and 115c at the selected first-leg rate; and (2) a charge/benefit for the second leg calculated from the second-leg distance travelled/use between the transponders 115c and 115d at the selected different second-leg rate.

In one aspect, utilizing personal identification data enables each participant commuter 104/106 as well as a driver/operator 102 to be rewarded for ride sharing. Thus, an organization or service provider may use occupant identity data to reward ride sharing customers 102/104/106 utilizing the vehicle 72 to reach an amusement park 62 with discount amusement park tickets for each ride sharing occupant 102/104/106 of the arriving vehicle 72, in some examples printing the discount tickets in real-time upon arrival. Rewards may also be differentiated based upon identity: for example, an owner/operator 102 of the vehicle 72 may receive a carbon-offset credit larger than a reward provided to the passengers 104/106, in one aspect in order to offer further encouragement to the driver 102 to expend efforts in seeking the other passengers 104/106 before beginning his or her trip.

In another example, a toll road access/egress point transponder 115b or a municipal parking lot 80 egress/ingress lane 82 transponder 115e may dynamically determine and charge a fee or fee discount at point of egress/entrance as a function of real-time occupant count data. Thus, a charge for entrance to a toll road 64 at an entrance transponder 115b, of for parking into the parking lot 80 at the egress/ingress lane 82 transponder, may be set at a maximum entrance fee for the vehicle 72 if determined to contain only one occupant, the driver 102; a lower two-party fee for two detected/determined occupants 102 and 104; and a still-lower three-party fee for three detected/determined occupants 102, 104 and 106, and so forth. Advantages accrued by such a system according to the present invention include benefiting the environment by reducing a number of vehicles 72 emitting pollutants using the toll road 64 of the parking lot 80, and also reducing demands on capacities and infrastructure (e.g. reducing requirements for new and additional parking structures or spaces responsive to parking demands).

In one aspect, charging a travel fee or awarding a benefit to a vehicle occupant/operator/owner/etc. is a function of an application of selected subset rate values to a determined amount of use of a ride-sharing option or the vehicle infrastructure by the observed traveling. The amount may be a one-time or single, discrete event, such as entering the parking lot 80 described above. The amount may also comprise a distance traveled on a road or other infrastructure relevant to a ride-sharing option; in one example, each of the three occupants 102/104/106 travelling in the vehicle 72 over a distance 82 (e.g. fifteen miles) between transponders 115a and 115d are awarded a larger benefit than that awarded for the same three occupants 102/104/106 travelling in the vehicle 72 over a shorter distance 80 (e.g. three miles) between transponders 115a and 115c, wherein the larger benefit is determined to more strongly encourage car-pooling over the longer 115a-115d trip distance 82 relative to the shorter 115a-115c trip distance 80. Additionally, some embodiments may set threshold travel or use amounts for triggering cost allocation or awarding benefits according to the present invention.

Thus, by providing a dynamic, automated, and real-time ride sharing reward system and method, the present invention enables additional individual passengers 104/106 and drivers 102, some who otherwise could not participate in prior art systems and methods at all (e.g. unable to commute at offered times and dates or over offered routes), to participate in ride-sharing and be commensurately rewarded, thus helping to reduce environmental pollutants otherwise introduced by more single-occupant or relatively lower-occupant vehicle trips.

Figure 4:
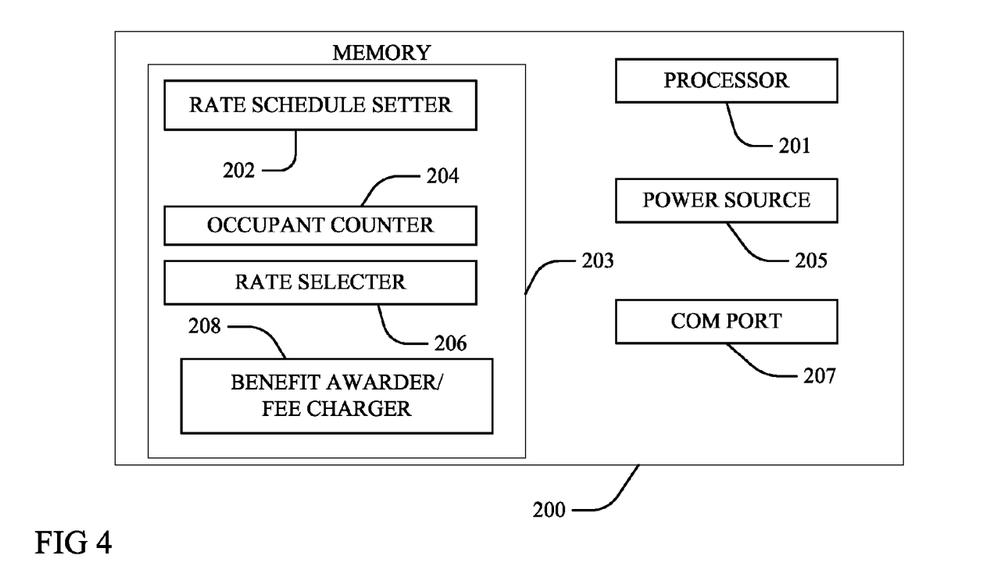
FIG. 4 is a block diagram of a system or device configured to enable charging of travel fees or awarding benefits as a function of vehicle occupancy according to the present invention.

FIG. 4 illustrates a programmable device or module 200 configured to select and apply variable toll thoroughfare rates according to the present invention, for example as illustrated in FIGS. 1-3 and described above. The device 200 may be incorporated into a large system wherein other components of the system accomplish systems and methods according to the present invention, or it may be a stand-alone device or module configured to perform each of the systems and methods, such as the transponder device or devices 108/110/112 or token 116 of FIG. 3. The present embodiment comprises a central processing unit (CPU) or other processing means 201 in communication with a memory 203.

The memory 203 comprises logic components that enable the CPU 201 to perform processes and methods according to the present application, as will be understood through reference to FIGS. 1-3 as discussed above. Thus, the memory 203 comprises a variable rate setter logic component 202 configured to create a variable travel fee schedule comprising a plurality of different rate values associated with ride-sharing service points and vehicle occupancy counts; an occupant counter logic component 204 configured to generate discrete occupant counts correlated with the ride-sharing service points; a rate selector logic component 206 configured to select a subset of rate values associated with the discrete occupant counts and correlated ride-sharing service points; and charger/awarder logic component 208 configured to charge travel fees or award benefits to occupants as a function of the subset rate values and an amount of vehicle traveling/infrastructure use.

A power unit 205 is configured to provide operative power to the device 200; examples include battery units 205 and power inputs configured to receive alternating or direct current electrical power, and other appropriate power units 205 will be apparent to one skilled in the art. A communication port or network link/node means 207 is also provided and configured to enable network and other communications with other devices, systems, monitoring, administrative and service provider entities, as well as others as appropriate.

II. Computerized Implementation

Figure 5:
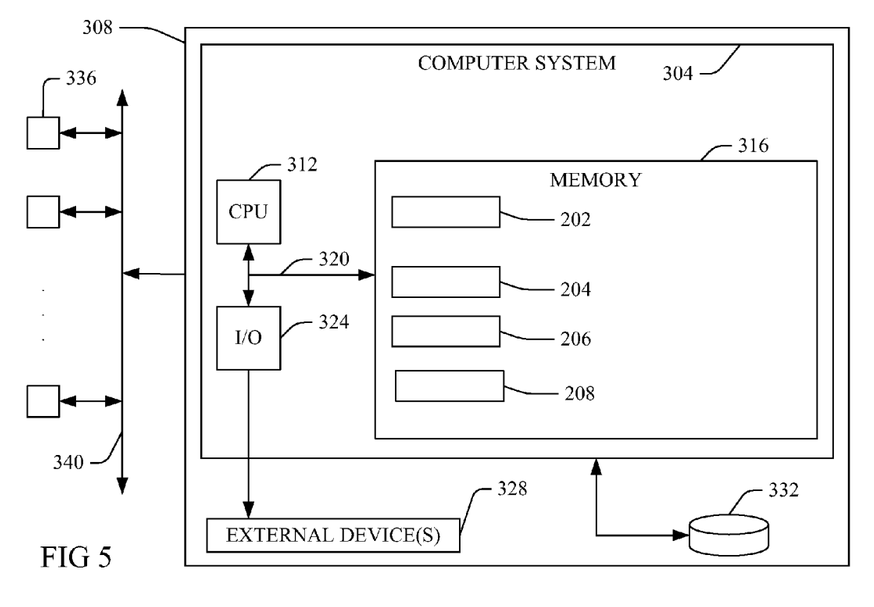
FIG. 5 is a block diagram illustrating a computerized implementation of a method and system for charging travel fees or awarding benefits as a function of vehicle occupancy according to the present invention.

Referring now to FIG. 5, an exemplary computerized implementation of the present invention includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the process and systems, and devices as illustrated in FIGS. 1-4 and described above, including the variable rate setter logic component 202, the occupant counter logic component 204, the rate selector logic component 206 and the charger/awarder logic component 208 discussed above, and which are stored in memory 316 and/or storage system 332. It is to be appreciated that two or more, including all, of these components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware.

To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 4 can be included in computer system 304. However, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to implement methods, systems and devices according to the present application, for example as illustrated in FIGS. 1-4 above and described otherwise herein. To this extent, the computer-readable/useable medium includes program code that implements each of the various process steps of the present application.

It is understood that the terms "computer-readable medium" or "computer useable medium" comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.), and/or as a data signal (e.g., a propagated signal) traveling over a network (e.g., during a wired/wireless electronic distribution of the program code).

Still yet, computer infrastructure 308 is intended to demonstrate that some or all of the components of implementation according to the present application could be deployed, managed, serviced, etc. by a service provider who offers to implement, deploy, and/or perform the functions of the present invention for others, for example by licensing methods and browser or application server technology to an internet service provider (ISP) or a cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the present application for one or more customers, and in return the service provider can receive payment from the customer(s) under a subscription and/or fee agreement and/or the service provider can receive payment from the sale of advertising content to one or more third parties.

In still another embodiment, the invention provides a computer-implemented method for enabling the processes, methods and devices according to the present application. In this case, a computer infrastructure, such as computer infrastructure 308, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 304, from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" of a plurality of elements, a "primary" distinguished from a "secondary," an "another", etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for awarding benefits as a function of vehicle occupancy, the method comprising:
   communicating via a wireless transponder with each of a plurality of machine-readable media devices located within a vehicle, wherein each of the machine-readable media devices have a unique identification indicia associated with each of a plurality of passengers within the vehicle;
   continuously counting in real-time a current number of occupants within the vehicle while the vehicle travels along a vehicle infrastructure by counting a number of the machine-readable media devices currently communicating with the wireless transponder;
   associating each of a plurality of benefit award rates with a plurality of different occupant counts, wherein higher occupant counts are associated with higher benefit award rates;
   awarding a variable benefit to each of the passengers within the vehicle without requiring the passengers to preregister with an awarding entity and as a function of an amount of use of the vehicle infrastructure by the vehicle and of the continuously counted real-time current number of occupants within the vehicle by:
      awarding a first leg benefit as a function of a first leg portion of the amount of use of the vehicle infrastructure by the vehicle having a constant first value for the continuously counted real-time current number of occupants within the vehicle and of the selected and applied one of the benefit award rates associated with the constant first value;
      awarding a second leg benefit that is higher than the first leg benefit as a function of a remainder portion of the amount of use of the vehicle infrastructure by the vehicle having a constant second leg value for the continuously counted real-time current number of occupants within the vehicle that is higher than the constant first leg value, and of a selected and applied one of the benefit award rates associated with the constant second value that is higher than the selected and applied one of the benefit award rates associated with the constant first value;
   notifying each of the passengers within the vehicle of the awarded first and second leg benefits; and
   increasing in real-time individual amounts of the variable benefit awarded to each of the passengers in proportion to an increase in the continuously counted real-time current number of occupants within the vehicle during the amount of use of the vehicle infrastructure by the vehicle.

2. The method of claim 1, further comprising:
   awarding a higher total amount of benefits to a driving passenger within the vehicle than a total amount of benefits awarded to a non-driving passenger within the vehicle as a function of identifying a driver status of the driving passenger.

3. The method of claim 2, wherein the vehicle infrastructure that the vehicle travels along is a road selected from a plurality of roads, the method further comprising:
   identifying a road of the plurality of roads as having a traffic condition that is heavier than a traffic condition of another of the plurality of roads; and
   notifying the passengers within the vehicle that awarding the variable benefit to the each of the passengers within the vehicle is conditional upon the vehicle travelling along the one road having the heavier traffic condition during the heavier traffic condition.

4. A method for awarding benefits as a function of vehicle occupancy, the method comprising:
   providing a wireless transponder computer infrastructure that:
      communicates wirelessly with each of a plurality of machine-readable media devices located within a vehicle, wherein each of the machine-readable media devices have a unique identification indicia associated with each of a plurality of passengers within the vehicle;
      continuously counts in real-time a current number of occupants within the vehicle while the vehicle travels along a vehicle infrastructure by counting a number of the machine-readable media devices currently communicating with the wireless transponder computer infrastructure;
      awards a variable benefit to each of the passengers within the vehicle without requiring the passengers to preregister with an awarding entity and as a function of an amount of use of the vehicle infrastructure by the vehicle, each of a plurality of benefit award rates associated with a plurality of different occupant counts wherein higher occupant counts are associated with higher benefit award rates, and of the continuously counted real-time current number of occupants within the vehicle, by:
         awarding a first leg benefit as a function of a first leg portion of the amount of use of the vehicle infrastructure by the vehicle having a constant first value for the continuously counted real-time current number of occupants within the vehicle and of the selected and applied one of the benefit award rates associated with the constant first value;

awarding a second leg benefit that is higher than the first leg benefit as a function of a remainder portion of the amount of use of the vehicle infrastructure by the vehicle having a constant second leg value for the continuously counted real-time current number of occupants within the vehicle that is higher than the constant first leg value, and of a selected and applied one of the benefit award rates associated with the constant second value that is higher than the selected and applied one of the benefit award rates associated with the constant first value;

notifying each of the passengers within the vehicle of the awarded first and second leg benefits; and increasing in real-time individual amounts of the variable benefit awarded to each of the passengers in proportion to an increase in the continuously counted real-time current number of occupants within the vehicle during the amount of use of the vehicle infrastructure by the vehicle.

5. The method of claim 4, wherein the computer infrastructure further:

awards a higher total amount of benefits to a driving passenger within the vehicle than a total amount of benefits awarded to a non-driving passenger within the vehicle as a function of identifying a driver status of the driving passenger.

6. The method of claim 5, wherein the vehicle infrastructure that the vehicle travels along is a road selected from a plurality of roads, and wherein the computer infrastructure further:

identifies a road of the plurality of roads as having a traffic condition that is heavier than a traffic condition of another of the plurality of roads; and notifies the passengers within the vehicle that awarding the variable benefit to the each of the passengers within the vehicle is conditional upon the vehicle travelling along the one road having the heavier traffic condition during the heavier traffic condition.

7. A computer program product for awarding benefits as a function of vehicle occupancy, the computer program product comprising:

a computer readable storage medium;

first program instructions that, when executing on a wireless transponder computer infrastructure, cause the wireless transponder computer infrastructure to communicate wirelessly with each of a plurality of machine-readable media devices located within a vehicle, wherein each of the machine-readable media devices have a unique identification indicia associated with each of a plurality of passengers within the vehicle, and to continuously count in real-time a current number of occupants within the vehicle while the vehicle travels along a vehicle infrastructure by counting a number of the machine-readable media devices currently communicating with the wireless transponder computer infrastructure;

second program instructions to award a variable benefit to each of the passengers within the vehicle without requiring the passengers to preregister with an awarding entity and as a function of an amount of use of the vehicle infrastructure by the vehicle, each of a plurality of benefit award rates associated with a plurality of different occupant counts wherein higher occupant counts are associated with higher benefit award rates, and of the continuously counted real-time current number of occupants within the vehicle, by:

awarding a first leg benefit as a function of a first leg portion of the amount of use of the vehicle infrastructure by the vehicle having a constant first value for the continuously counted real-time current number of occupants within the vehicle and of the selected and applied one of the benefit award rates associated with the constant first value;

awarding a second leg benefit that is higher than the first leg benefit as a function of a remainder portion of the amount of use of the vehicle infrastructure by the vehicle having a constant second leg value for the continuously counted real-time current number of occupants within the vehicle that is higher than the constant first leg value, and of a selected and applied one of the benefit award rates associated with the constant second value that is higher than the selected and applied one of the benefit award rates associated with the constant first value; and notifying each of the passengers within the vehicle of the awarded first and second leg benefits; and third program instructions to increase in real-time individual amounts of the variable benefit awarded to each of the passengers in proportion to an increase in the continuously counted real-time current number of occupants within the vehicle during the amount of use of the vehicle infrastructure by the vehicle; and wherein the first, second and third program instructions are stored on the computer readable storage medium.

8. The computer program product of claim 7, wherein the third program instructions are further to award a higher total amount of benefits to a driving passenger within the vehicle than a total amount of benefits awarded to a non-driving passenger within the vehicle as a function of identifying a driver status of the driving passenger.

9. The computer program product of claim 8, wherein the vehicle infrastructure that the vehicle travels along is a road selected from a plurality of roads, and wherein the third program instructions are further to:

identify a road of the plurality of roads as having a traffic condition that is heavier than a traffic condition of another of the plurality of roads; and notify the passengers within the vehicle that awarding the variable benefit to the each of the passengers within the vehicle is conditional upon the vehicle travelling along the one road having the heavier traffic condition during the heavier traffic condition.

10. A system, comprising:

a processing unit, computer readable memory and a computer readable storage system;

first program instructions that, when executing on a wireless transponder computer infrastructure, cause the wireless transponder computer infrastructure to communicate wirelessly with each of a plurality of machine-readable media devices located within a vehicle, wherein each of the machine-readable media devices have a unique identification indicia associated with each of a plurality of passengers within the vehicle, and to continuously count in real-time a current number of occupants within the vehicle while the vehicle travels along a vehicle infrastructure by counting a number of the machine-readable media devices currently communicating with the wireless transponder computer infrastructure;

second program instructions to award a variable benefit to each of the passengers within the vehicle without requiring the passengers to preregister with an awarding entity and as a function of an amount of use of the vehicle infrastructure by the vehicle, each of a plurality of benefit award rates associated with a plurality of different occupant counts wherein higher occupant counts are associated with higher benefit award rates, and of the continuously counted real-time current number of occupants within the vehicle by:
  awarding a first leg benefit as a function of a first leg portion of the amount of use of the vehicle infrastructure by the vehicle having a constant first value for the continuously counted real-time current number of occupants within the vehicle and of the selected and applied one of the benefit award rates associated with the constant first value;
  awarding a second leg benefit that is higher than the first leg benefit as a function of a remainder portion of the amount of use of the vehicle infrastructure by the vehicle having a constant second leg value for the continuously counted real-time current number of occupants within the vehicle that is higher than the constant first leg value, and of a selected and applied one of the benefit award rates associated with the constant second value that is higher than the selected and applied one of the benefit award rates associated with the constant first value;
  notifying each of the passengers within the vehicle of the awarded first and second leg benefits; and
  third program instructions to increase in real-time individual amounts of the variable benefit awarded to each of the passengers in proportion to an increase in the continuously counted real-time current number of occupants within the vehicle during the amount of use of the vehicle infrastructure by the vehicle; and
wherein the first, second and third program instructions are stored on the computer readable storage system for execution by the processing unit via the computer readable memory.

11. The system of claim 10, wherein the third program instructions are further to award a higher total amount of benefits to a driving passenger within the vehicle than a total amount of benefits awarded to a non-driving passenger within the vehicle as a function of identifying a driver status of the driving passenger.

12. The system of claim 11, wherein the vehicle infrastructure that the vehicle travels along is a road selected from a plurality of roads, and wherein the third program instructions are further to:
  identify a road of the plurality of roads as having a traffic condition that is heavier than a traffic condition of another of the plurality of roads; and
  notify the passengers within the vehicle that awarding the variable benefit to the each of the passengers within the vehicle is conditional upon the vehicle travelling along the one road having the heavier traffic condition during the heavier traffic condition.

* * * * *